Oct. 5, 1965  T. H. HASKELL ET AL  3,210,246
SUCCINIMYCIN AND ACID-ADDITION SALTS THEREOF
Filed Sept. 22, 1960  2 Sheets-Sheet 1
FIG.I.
ABSORPTION SPECTRUM OF
SUCCINIMYCIN ACETATE
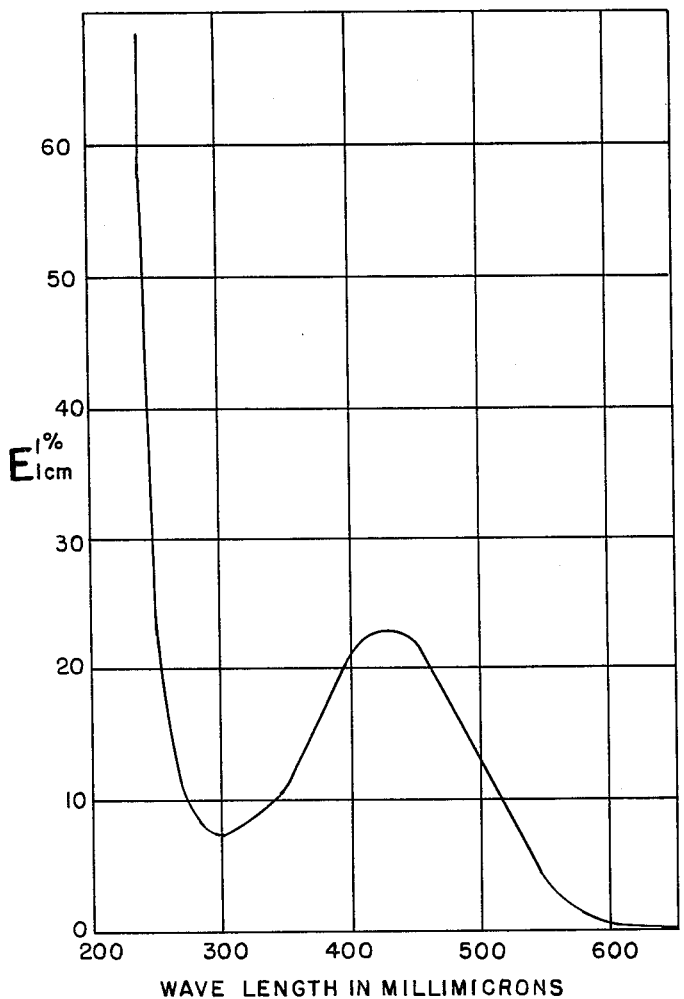
INVENTORS
THEODORE H. HASKELL
JOHN EHRLICH
JAMES C. FRENCH
BY RICHARD H. BUNGE
ROBERT F. PITTILLO
*Whittemore, Hulbert & Belknap*
ATTORNEYS

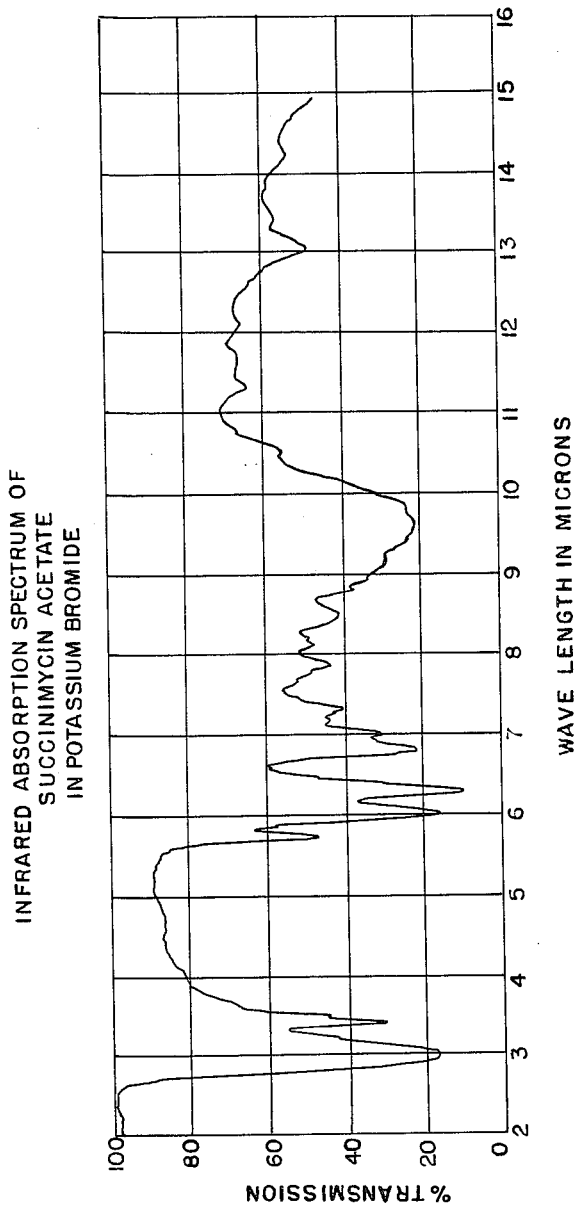

3,210,246
SUCCINIMYCIN AND ACID-ADDITION SALTS THEREOF
Theodore H. Haskell, Ann Arbor, John Ehrlich, Grosse Pointe Park, and James C. French and Richard H. Bunge, St. Clair Shores, Mich., and Robert F. Pittillo, Birmingham, Ala., assignors to Parke, Davis & Company, Detroit, Mich., a corporation of Michigan
Filed Sept. 22, 1960, Ser. No. 57,695
4 Claims. (Cl. 167—65)

The present invention relates to a new chemical substance called succinimycin. More particularly, it relates to succinimycin, to acid-addition salts of succinimycin, to des-iron succinimycin, to acid-addition salts of des-iron succinimycin, and to methods for the production of the foregoing compounds.

Succinimycin is a basic substance having a reddish-orange color. It contains the elements carbon, hydrogen, nitrogen, oxygen, and iron. The iron is present in the form of a chelate which is responsible for the reddish-orange color of succinimycin.

Succinimycin is relatively unstable in acidic and basic solutions. Its rate of decomposition at various pH's can be determined by measuring the loss of its characteristic antibacterial activity. At pH 3 succinimycin loses 96% of its activity in 24 hours at room temperature. At pH 7.8 succinimycin loses 48% of its activity in 24 hours at room temperature. At pH 9 succinimycin loses 96% of its activity in 24 hours at room temperature. Solutions containing succinimycin at a pH of 5 to 6 (under which conditions succinimycin is present as an acid-addition salt) exhibit maximum stability. For the foregoing reasons succinimycin is preferably obtained, purified, characterized, and used in the form of one of its various acid-addition salts, rather than as the free base.

Succinimycin forms pharmaceutically-acceptable acid-addition salts with a variety of organic and inorganic acids, such as acetic, propionic, maleic, malic, citric, gluconic, hydrochloric, hydrobromic, phosphoric, sulfuric, and related acids.

Succinimycin acetate contains about 46% carbon (range of experimentally determined values 45.03 to 46.39); about 7% hydrogen (range of experimentally determined values 6.63 to 7.30); about 8.5% nitrogen (range of experimentally determined values 8.11 to 8.92); about 4.5% iron (range of experimentally determined values 4.01 to 4.85); and about 7% ash (range of experimentally determined values 6.41 to 7.79).

In the drawings, FIGURE 1 shows the absorption spectrum of succinimycin acetate, in pH 7 phosphate buffer, in the ultraviolet and visible region. An absorption maximum appears at 430 millimicrons $$E_{1\,cm.}^{1\%} = 22.8.$$

FIGURE 2 shows the infrared spectrum of succinimycin acetate determined in a potassium bromide disc. Principal absorption maxima appear at about 3.00, 3.44, 5.78, 6.06, 6.35, 6.85, 7.03, 7.36, 7.94, 8.6, 9.7 and 13.1 microns.

By treatment of succinimycin or an acid-addition salt with a chelating agent such as cupferron the iron is removed and there are obtained the corresponding substances designated as des-iron succinimycin and its acid-addition salts. The des-iron compounds are almost colorless materials which are suitable for identifying qualitative tests. Des-iron succinimycin gives negative Ehrlich's, Fehling's, Benedict's, and ninhydrin tests. Des-iron succinimycin and its acid-addition salts have approximately one-half the anti-bacterial activity of succinimycin and its acid-addition salts. The addition of dilute ferric lactate restores substantially all of the antibacterial activity. The addition of dilute cupric acetate restores most of the antibacterial activity. Little or no rise in antibacterial activity occurs upon addition of a dilute solution of ferrous ammonium sulfate, cobaltous acetate, manganous sulfate, nickel chloride, or zinc chloride.

Upon hydrolysis succinimycin and its acid-addition salts yield succinic accid, 1,5-pentanediamine, ammonia, methylamine, proline, and at least three other amino acids. For example, a solution of 84 mg. of succinimycin acetate in 1 ml. of water is treated with 5 ml. of 0.5 normal barium hydroxide and the resulting mixture heated at 90° C. for 72 hours. The mixture is filtered and the filtrate acidified with sulfuric acid and again filtered. The final filtrate is concentrated to approximately 8 ml. and continuously extracted with ether for 4 hours. Evaporation of the ether extract yields 30 mg. of a solid residue. After two recrystallizations there is obtained 14 mg. of pure succinic acid.

The separation and identification of other products from the hydrolysis of succinimycin and its acid-addition salts can also be carried out by other means. For example, a mixture of 566 mg. of succinimycin acetate in 25 ml. of aqueous 0.5-normal barium hydroxide is heated at 95–100° C. for 6 days in a closed reaction vessel. The mixture is diluted with water and the volatile bases removed by distillation with steam into 20 ml. of 0.1-normal hydrochloric acid. Paper chromatography of the hydrochlorides of the volatile bases using phenol: 0.1-normal hydrochloric acid 70:30 (weight/volume) and measurement of $R_f$ values demonstrates the presence of ammonia and methylamine. The aqueous solution remaining after distillation of the volatile bases with steam is acidified with sulfuric acid and filtered. The filtrate is concentrated to about 8 ml. and continuously extracted with ether for 12 hours to afford 75 mg. of a solid which yields pure succinic acid upon crystallization. The aqueous solution remaining from the ether extraction is treated with excess barium hydroxide and filtered. The filtrate is adjusted to pH 4.2 with sulfuric acid, again filtered, and finally evaporated to dryness to leave 273 mg. of a syrup. The syrup is fractionated by means of paper electrophoresis into 4 principal ninhydrin-positive bands. In an experiment using 8 sheets of Whatman No. 3, 40 x 29 cm. paper, and a pyridine acetate buffer at pH 6.0 at 400 volts for 95–100 minutes in a Spinco paper electrophoresis assembly, model R, the movement from the origin of the 4 principal bands is found to be, respectively, 3.9–4.5 cm. toward the anode, 0.9–1.4 cm. toward the cathode, 7.2–8.1 cm. toward the cathode, and 13.5–15 cm. toward the cathode. From the fraction moving most rapidly toward the cathode 1,5-pentanediamine is isolated. From the fraction moving least rapidly toward the cathode proline is isolated.

The behavior of succinimycin and its acid-addition salts when subjected to paper electrophoresis also provides a useful means of characterizing these substances and of distinguishing them from other substances of related structure. When a succinimycin solution in 0.05 molar pH 4.0 acetate buffer is subjected to paper electrophoresis for 2.5 hours at 360 volts and 12 milliamperes the succinimycin travels 7.9 cm. from the origin toward the cathode. The location of the succinimycin spot is determined visually or by bioassay against *Bacillus subtilis*.

Still another method of characterizing succinimycin and its acid-addition salts is by means of paper chromatography. A succinimycin chromatogram developed with 70:30 isopropyl alcohol: 0.2 molar pH 6.0 acetate buffer exhibits and $R_f$ of 0.40. A succinimycin chromatogram developed with 80:20 ethanol: 0.2 molar pH 6.0 acetate buffer exhibits an $R_f$ of 0.52.

Succinimycin and its acid-addition salts are further characterized by means of their spectrum of antibacterial activity. The antibacterial spectrum of a succinimycin preparation (purified acetate) expressed in terms of the minimum inhibitory concentration (microgram/ml.) against a variety of organisms appear in Table 1. The multiple entries given under certain species in Table 1 represent different strains of the organism and are for the purpose of illustrating the variability observed for different strains of the species. High activity against an organism is shown by inhibition of the growth of the organism at a concentration of less than 1 microgram/ml., whereas relative inactivity against an organism is shown by inhibition of the growth of the organism only at a concentration of 10 micrograms/ml. or higher.

TABLE 1.—IN VITRO ANTIBACTERIAL SPECTRUM OF SUCCINIMYCIN

| Microorganism | Strain | Minimum Inhibitory Concentration, Micrograms/ml. |
|---|---|---|
| Staphylococcus aureus | UC 76 | 0.0025 |
| Do | Smith | 0.005 |
| Do | Giorgio | 0.01 |
| Do | (1) | 0.01 |
| Do | (1) | 0.63 |
| Do | (1) | >10 |
| Do | (1) | 0.04 |
| Do | (2) | 0.02 |
| Do | (2) | 0.01 |
| Do | (2) | 0.01 |
| Do | (2) | 0.01 |
| Do | (2) | 0.02 |
| Do | (2) | 0.005 |
| Do | (2) | 0.01 |
| Do | (2) | >10 |
| Streptococcus, Lancefield Gp. A | | >10 |
| Do | | >10 |
| Streptococcus, Lancefield Gp. B | | 0.02 |
| Do | | 0.01 |
| Streptococcus, Lancefield Gp. C | | >10 |
| Do | | >10 |
| Streptococcus, Lancefield Gp. D | | >10 |
| Do | | >10 |
| Streptococcus, Lancefield Gp. E | | >10 |
| Do | | >10 |
| Streptococcus, Lancefield Gp. F | | >10 |
| Streptococcus, Lancefield Gp. G | | 0.0025 |
| Do | | 0.005 |

[1] Phage type 80/81.
[2] Clinical isolate resistant to one or more of the common antibiotics.

The antibacterial activity of succinimycin and its acid-addition salts against organisms resistant to the inhibitory action of various antibiotics is further shown in Table 2. Table 2 illustrates the antibacterial activity of a succinimycin preparation (containing 50,000–60,000 activity units per milligram, as hereinafter defined) expressed in terms of the minimum inhibitory concentration (micrograms/ml.) against a variety of resistant strains of Staphylococcus aureus Smith.

TABLE 2.—IN VITRO ACTIVITY OF SUCCINIMYCIN AGAINST VARIOUS STRAINS OF STAPHYLOCOCCUS AUREUS SMITH

| Microorganism | Minimum inhibitory Concentration,* Micrograms/ml. |
|---|---|
| Sensitive parent strain | 0.02 |
| Penicillin-resistant strain | 0.02 |
| Erythromycin-resistant strain | 0.005 |
| Tetracycline-resistant strain | 0.02 |
| Streptomycin-resistant strain | 0.01 |

* Succinimycin preparation containing 50,000–60,000 units per milligram.

Succinimycin and its acid-addition salts can be produced in accordance with the invention by cultivating a selected succinimycin-producing strain of the organism Streptomyces olivochromogenes under artificial conditions in a suitable nutrient medium until substantial antibacterial activity is imparted to the medium. Following the period of cultivation or incubation succinimycin or an acid-addition salt thereof can be obtained from the medium by procedures described hereinafter and can be subjected to the degree of further purification desired. The term "succinimycin-producing strain of Streptomyces olivochromogenes" as used in the present specification and claims means a strain of Streptomyces olivochromogenes which, when propagated under the artificial conditions herein described, causes the formation of a beer which succinimycin or an acid-addition salt thereof can be obtained by the procedures set forth.

A strain of Streptomyces olivochromogenes suitable for the purposes of the invention has been isolated from a TABLE 3.—MACROSCOPIC CULTURAL CHARACTERISTICS OF SUCCINIMYCIN-PRODUCING STRAIN OF STREPTOMYCES OLIVOCHROMOGENES CORRESPONDING TO NRRL 2608

| Culture Medium | Color of— | | | Other Features |
|---|---|---|---|---|
| | Aerial Mycelium | Substratal Mycelium | Substrate | |
| Glycerol Asparagine Agar | White to gray | White to lt. yellow to gray (occasionally blue in heavy growth areas). | Unchanged | |
| Starch Synthetic Agar | White to pink to lt. gray to dk. gray. | White to lt. yellow to gray | do | Moderate hydrolysis. |
| Tyrosine Starch Synthetic Agar. | White to gray | Gray to black | Dk. gray, almost black | |
| Calcium Malate Agar | do | Lt. brown to gray | Unchanged | |
| Czapek Dox Agar | White to dk. gray | Lt. yellow to gray, blue-black patches. | do | |
| Nutrient Agar | White to lt. gray | Tan-gray to blue to dk. blue-gray. | Dk. gray | Surface smooth to folded; aerial growth slight. |
| Glucose Nutrient Agar | White to dk. gray | Tan to brown, some blue-black patches. | Gray | Colonies with undulate margin, water droplets on surface. |
| Glucose Tryptone Agar | White to pink-gray to dk. gray. | Red-brown to gray to black | Dk. gray, almost black | Water droplets on surface of colonies. |
| Anderson's Sporulation Agar. | White to gray | Brown to black | Black | |
| Potato Slice | White to lt. gray | Gray to brown-gray | Dk. gray near mycelium | Colonies small, wrinkled; aerial growth slight. |
| Glucose Synthetic Agar | White | Tan to gray | Unchanged | Colonies small, wrinkled, with undulate margin; aerial growth slight. |
| Cellulose | White to gray | White to gray | do | Moderate growth. |
| Gelatin | | Brown | Black | Liquefied slowly; growth in small pellets. |
| Litmus Milk | Lt. gray | Gray | Dark blue | Cracked wrinkled pellicle; no coagulation; moderate peptonization. |
| Nitrate Broth | | | Unchanged | Strong reduction to nitrite. |
| Bacto SIM Agar | | | Black | Hydrogen sulfide positive (Lead Acetate paper also blackened). |
| Glucose Broth | | Lt. brown | Lt. brown | Growth in pellets along sides of tube; flaky sediment. |

Lt.=light. Dk.=dark.

soil sample collected from an arum field near Matanzas, Cuba. Cultures of this organism have been deposited with the United States Department of Agriculture, Northern Utilization Research and Development Division, Peoria, Illinois, and are being maintained in their permanent culture collection as NRRL 2608.

The organism is an aerobic and aerially sporulating member of the order Actinomycetales and belongs in the genus Streptomyces as described in the seventh edition of Bergey's Manual of Determinative Bacteriology. Its macroscopic cultural characteristics on numerous media useful for identification of members of this genus are shown in Table 3.

When the organism is cultivated on certain agar media, the aerial mycelium is at first white, becoming light gray and later dark gray. In early stages of growth, the aerial mycelium is occasionally pink-gray, especially on starch synthetic, and glucose tryptone agar media. The aerial mycelium is velvety to fluffy and is often beaded with hyaline droplets. The substratal mycelium is usually white to light yellow, becoming gray to brown or black. A dark blue color is occasionally formed in the substratal mycelium on some media such as glycerol asparagine, Czapek Dox, nutrient, and glucose nutrient agar. Coremium-like aggregations of substratal hyphae are occasionally formed on some media such as glycerol asparagine agar. A dark brown or black soluble pigment is formed in media containing complex nitrogen sources.

The aerial hyphae are hyaline and moderately long with straight, looped, or spiralled lateral branches. The lateral branches are usually short, simple or variously branched. Distal portions of the aerial hyphae subdivide into spore chains usually ranging in length from 10 to 50 microns. The spore chains are straight, looped, or spiralled. The spirals are open or closed and usually have 3 to 6 convolutions. Vegetative hyphae are approximately 0.5 to 1 micron wide. The sporulating aerial hyphae are wider than the vegetative, ranging from 1.2 to 2.3 microns. The spores are usually spherical but occasionally oval, often quite variable in size within a chain, ranging from 1.2 x 1.2 micron to 2.3 x 2.3 microns.

In carbon utilization tests, good to fair growth was obtained with the following single carbon sources: L-arabinose, adonitol, cellobiose, dextrin, dextrose, D-galactose, glycerol, i-inositol, inulin, lactose, levulose, maltose, D-mannitol, D-mannose, melibiose, raffinose, rhamnose, starch, sucrose, trehalose, and D-xylose. Poor to no growth was obtained with aesculin, melezitose, salicin, and D-sorbitol.

In its aerial mycelial color and spirals, the organism resembles *Streptomyces olivochromogenes* and it is therefore regarded as a member of this species. In certain other cultural characteristics, however, our organism is distinctly different from *S. olivochromogenes* as described in the seventh edition of Bergey's Manual (Table 4) and *S. olivochromogenes* corresponding to ATCC 3336 (Table 5). Our organism is therefore regarded as a new and distinct strain of this species, the new strain being represented by culture number NRRL 2608.

TABLE 4.—COMPARISON OF SUCCINIMYCIN-PRODUCING STRAIN OF *STREPTOMYCES OLIVOCHROMOGENES* CORRESPONDING TO NRRL 2608, WITH *STREPTOMYCES OLIVOCHROMOGENES* AS DESCRIBED IN BERGEY'S MANUAL

| Characteristic | *S. olivochromogenes* corresponding to NRRL 2608 | *S. olivochromogenes* as described in Bergey's Manual |
|---|---|---|
| Conidia | Usually spherical, occasionally oval. | Ellipsoidal. |
| Gelatin Liquefaction | Slow. | Rapid. |
| Growth on Synthetic Agar | White to lt. yellow to gray, occasionally blue. | White. |
| Growth on Glucose Agar | Tan to brown, some blue-black; undulate margin. | Natal brown to almost black; entire margin. |
| Growth on Nutrient Agar | Smooth to folded, tan-gray to blue to blue-gray. | Wrinkled, brown, becoming gray-green. |
| Litmus Milk Growth | Gray, cracked, wrinkled pellicle; milk not coagulated. | Dark brown ring, milk coagulated. |
| Potato Growth | Small wrinkled gray to brown-gray colonies. | Small, wrinkled, black colonies. |
| Nitrate Reduction | Strong nitrite test. | Faint traces of nitrite. |

TABLE 5.—COMPARISON OF SUCCINIMYCIN-PRODUCING STRAIN OF *STREPTOMYCES OLIVOCHROMOGENES* CORRESPONDING TO NRRL 2608, WITH *STREPTOMYES OLIVOCHROMOGENES* CORRESPONDING TO ATCC 3336

| Characteristic | *S. olivochromogenes* Corresponding to NRRL 2608 | *S. olivochromogenes* Corresponding to ATCC 3336 |
|---|---|---|
| Color of Aerial Mycelium: | | |
| Glycerol Asparagine Agar | White to gray, good growth. | White, slight growth. |
| Starch Synthetic Agar | White to pink to gray, good growth. | White to gray, slight growth. |
| Glucose Nutrient Agar | White to dark gray, good growth. | No growth. |
| Czapek Dox Agar | do. | White, slight growth. |
| Nutrient Agar | White to light gray, slight growth. | No growth. |
| Potato Slice | do. | Do. |
| Glucose Synthetic Agar | White, slight growth. | Do. |
| Color of Substratal Mycelium: | | |
| Glycerol Asparagine Agar | White to light yellow to gray (occasionally blue in heavy growth areas). | Yellow-orange, slight green. |
| Starch Synthetic Agar | White to light yellow to gray. | White to yellow-gray to black. |
| Glucose Nutrient Agar | Tan to brown, some blue-black. | Yellow-gray to dark gray. |
| Czapek Dox Agar | Light yellow to gray, blue-black patches. | White, slight growth. |
| Nutrient Agar | Tan-gray to blue to dark blue-gray. | White to gray. |
| Potato Slice | Gray to brown-gray. | Gray. |
| Glucose Synthetic Agar | Tan to gray. | White to light gray. |
| Nitrate Reduction | Strong reduction to nitrite. | Slight reduction to nitrite. |

In accordance with the invention, succinimycin and its acid-addition salts are produced by inoculating an aqueous nutrient medium with a succinimycin-producing strain of *Streptomyces olivochromogenes,* conducting a fermentation under aseptic aerobic conditions at a temperature between about 20 and 40° C. until substantial antibacterial activity has been imparted to the fermentation mixture, and subjecting the fermentation mixture to subsequent treatment in order to obtain the desired product.

For the inoculation spores or conidia of the selected culture of *Streptomyces olivochromogenes* can be used. Aqueous suspensions of the spores or conidia containing a small amount of soap or another wetting agent can be conveniently employed. For large fermentations it is preferable to use vigorous young aerated and agitated broth cultures of the microorganism.

Suitable aqueous nutrient media are those containing assimilable sources of carbon and nitrogen and preferably having a pH between about 6 and 8. Sources of carbon which are assimilable and satisfactory for use include pure carbohydrates which can be utilized by the organism as well as commercially-available carbohydrate mixtures. Some examples of the materials which are suitable for this purpose are glucose, maltose, lactose, mannose, starch and modified starches, corn syrup, malt liquors, blackstrap molasses, glycerol and the like. The quantity of the carbohydrate present in the nutrient medium is not particularly critical and can vary from about 0.5 to 5% by weight of the medium. Quantities somewhat outside of this range can also be used.

The sources of nitrogen in the nutrient medium can be of an organic, inorganic, or mixed organic-inorganic nature. Some examples of the many nitrogenous substances which can be employed in the nutrient medium are amino acids, peptones, hydrolyzed and unhydrolyzed proteins, fish meal, soybean meal, corn steep liquor, dehydrated corn steep liquor, meat extracts, peanut meal, inorganic nitrates, urea, ammonium salts and the like. Due to the crude nature of most of the readily-available nitrogen sources, the quantity to be added to the medium varies according to the purity and it is not readily possible to specify a definite quantity of nitrogenous source material which should be added to the medium. However, it can be said that for practical purposes, nitrogenous materials need not exceed 6% by weight of the total fermentation medium and can be present in a considerably lower amount.

The presence of a certain amount of mineral salts and traces of growth factors of unknown composition is desirable in order to obtain the best yields of succinimycin and its acid-addition salts. Many readily-available crude materials such as corn steep liquor, butanol-acetone fermentation residues, yeast preparations, soybean oil meal, and other products of like character contain such inorganic salts and growth factors and the inclusion of one or more of these materials in the fermentation medium is desirable. In order to ensure the presence of adequate amounts of the mineral components of the medium, it is also advantageous in many cases to add some inorganic salts such as sodium chloride, sodium bicarbonate, calcium carbonate, sodium acetate and the like. If the medium is deficient in iron, an iron salt such as ferric chloride or ferric lactate should be added. The preferred concentration of mineral salts is between 0.1 and 1% by weight of the nutrient medium.

The cultivation of the selected strain of *Streptomyces olivochromogenes* in the aqueous nutrient medium can be carried out in a number of different ways. For example, the organism can be cultivated under aerobic conditions on the surface of the medium; or it can be cultivated beneath the surface of the medium, that is in the submerged condition, provided that an adequate supply of oxygen is furnished.

The preferred method for producing succinimycin and its acid-addition salts on a large scale is by the fermentation of a succinimycin-producing strain of *Streptomyces olivochromogenes* in a submerged or deep culture. According to this embodiment of the invention, a sterile aqueous nutrient medium is inoculated with the selected culture and incubated with agitation and aeration at a temperature between about 20 and 40° C., preferably in the neighborhood of 32–37° C., until substantial antibacterial activity is found in the culture liquid. The length of time required for the maximum yield varies with the size and type of equipment used, the rates of agitation and aeration, the specific organism culture and other factors. In large scale commercial fermentations carried out in the tank-type fermentors, maximum production is usually reached in about 1 to 3 days. Shorter fermentation periods can also be used, but usually produce a lower yield. When the fermentation is carried out in shaken flasks, the time required for maximum production may be somewhat longer than when large fermentation tanks are used.

Under the submerged culture conditions, the microorganism develops as relatively discrete particles dispersed throughout the nutrient medium in contrast to the relatively continuous pellicle present on the surface of the medium in the surface culture method. By virtue of this distribution of the organism throughout the medium, large volumes of the inoculated nutrient medium can be used in the cultivation of the organism in the tanks and vats customarily employed in the fermentation industry. Stationary vat fermentors equiped with agitation and aeration devices are particularly suitable for large-scale production, although fermentation equipment of other designs can also be used. For the production of smaller quantities of product or for the preparation of cultures of the organism to be used as inoculum for large-scale fermentations, the submerged culture method can be carried out in small flasks or jars which are either shaken or stirred by suitable mechanical means.

In the submerged culture method, agitation and aeration of the culture mixture can be accomplished in a number of ways. Agitation can be provided by turbines, paddles, impellers or other mechanical agitation devices, by revolving or shaking the fermentor itself, by various pumping devices or by the passage of air or oxygen through the medium. Aeration can be brought about by injecting air or oxygen into the fermentation mixture through open pipes, perforated pipes, or pipes containing a porous diffusion section; or it can be brought about by spraying, splashing or spilling the medium into or through an oxygen-containing atmosphere.

An alternative to the preferred submerged culture method is the surface culture method of producing succinimycin and its acid-addition salts, according to which a shallow layer, usually less than 2 cm., of a sterile, aqueous nutrient medium is inoculated with a succinimycin-producing strain of *Streptomyces olivochromogenes* and the inoculated mixture is incubated under aerobic conditions at a temperature between about 20 and 40° C. The product is then obtained in a manner similar to that to be described for the submerged culture method.

The antibacterial activity present after the fermentation period or at any time during the fermentation period can be determined by bioassay. For this purpose a representative aliquot is obtained from the fermentation mixture and filtered to remove solid material. The antibacterial activity of the beer can then be determined by measuring the inhibition in the growth of the microorganism *Bacillus subtilis* under conditions normally favorable to the growth of the organism. For this bioassay, a tray or plate agar culture of the test organism is prepared. Filter paper discs containing a measured amount of a measured dilution of the beer are placed against the surface of the agar culture and the inhibition in the growth of the organism is observed after an incubation period. The bioassay depends upon the fact that succinimycin and its acid-addition salts are characteristically antagonistic to the growth of the organism with the result that the zone of inhibition surrounding the filter paper disc varies with the quantity of product dispersed in the disc. The assignment of potency is based on the dilution of the beer required to produce an arbitrarly-selected inhibition zone diameter under the standard test conditions.

In carrying out this procedure, the antibacterial activity is measured by a paper disc-tray agar-diffusion method similar to that which has been described for the assay of viomycin by Ehrlich, Iverson and Kohberger, "Antibiotics and Chemotherapy," 1, (3): 211–216 (June 1951). In adapting this method to the assay of the beers and products obtained in the present invention the following modifications are employed. The test organism is *Bacillus subtilis* corresponding to ATCC 6633. In preparing the spore suspension a culture of the organism is incubated at 37° C. for 18 hours on 3 slants prepared with a medium such as Penassay Seed Agar (Difco). The cells from each slant are suspended in 10 ml. of sterile distilled water. Each of 5 Roux bottles containing 200 ml. of a medium prepared from Brain Heart Infusion with 0.01% manganese sulfate and 2% agar is inoculated with 2 ml. of the cell suspension and incubated at 37° C. for 72 hours. Another cell suspension is then prepared by suspending the cells in each of the 5 Roux bottles with 20 ml. of sterile distilled water. This cell suspension is heated at 65° C. for 30 minutes for pasteurization and rapidly cooled. Each of 25 Roux bottles containing 200 ml. of a medium such as Penassay Seed Agar is inoculated with 2 ml. of the pasteurized suspension and incubated at 37° C. for 48 hours. The growth in each bottle is suspended in 20 ml. of sterile distilled water. The combined suspension is heated at 65° C. for 30 minutes, cooled immediately in an ice bath, and centrifuged in portions at 2000 r.p.m. for 30 minutes. The liquid is discarded and the spores are freed from contaminants by repeated resuspension in sterile distilled water and centrifugation. For use, the spores are finally resuspended in 1 liter of sterile distilled water which is then dispensed into individual vials which are pasteurized by heating at 65° C. for 30 minutes, and rapidly cooled.

In the agar trays in which the assay is carried out a material such as Mycin Assay Agar (Difco) is employed for both the base and seed layers. The compositions of Penassay Seed Agar, Brain Heart Infusion, and Mycin Assay Agar are described in "Difco Manual of Dehydrated Culture Media and Reagents for Microbiological and Clinical Laboratory Procedures," ninth edition. Agars and infusions of similar composition can also be used. The required dilution of the spore suspension in the assay medium is determined in preliminary agar trays inoculated with various dilutions of the suspension and spotted with paper discs bearing 0.08 ml. of a standard solution containing 30 units of succinimycin activity per ml. in 0.1-molar pH 6.0 phosphate buffer. That dilution of suspension is used which, after 18 hours' incubation gives confluent growth and a sharply defined inhibition zone, usually between 19.0 and 20.0 mm. in diameter, surrounding the paper discs treated with the standard solution.

In order to measure the potency of an unknown solution various dilutions of the solution are prepared with pH 6.0 phosphate buffer. The final solutions, as well as solutions of the standard, are prepared to contain a final buffer concentration of 0.1-molar.

The original standard is a beer to which a value of 300 units per milliliter was assigned. This assignment of potency was based on the fact that a 300-fold dilution of this material prepared in pH 6.0 phosphate buffer to a final buffer concentration of 0.1-molar and tested under the conditions described above gave an arbitrarily selected average inhibition zone diameter of 13.6 mm. Purified succinimycin preparations are found to contain about 200,000 activity units per milligram.

After completion of the fermentation phase of the process the desired product can be obtained in any of a number of ways. For example, in the case of the submerged culture method the mycelium is separated by such means as filtration or centrifugation. The filtered beer is made slightly acidic and the crude product is adsorbed by treatment of the beer with activated charcoal, or other adsorbing agent.

The adsorption can be carried out either in batches or by continuous flow through an adsorption column. The adsorbent is washed with a small quantity of dilute acetone and with water and the crude product is removed by elution with aqueous acetone. A concentration of 30–60% acetone is usually satisfactory. The product is then readsorbed by passing it through a column containing a high porosity synthetic cation exchange resin in the sodium, ammonium or potassium form. The product is removed from the column by displacement with an aqueous salt solution such as 5–10% sodium sulfate. The eluates from this column contain an acid-addition salt of succinimycin as well as inorganic salts. The inorganic salts are removed by adsorption of the product on activated carbon, followed by washing the adsorbent with water until free of inorganic salts and then removing the product by elution with aqueous acetone. The eluate in aqueous acetone is freeze-dried to yield, depending on pH adjustment, succinimycin or an acid-addition salt thereof. The acid-addition salts are preferably isolated from aqueous media at a pH of 4 to 6, usually about 5 to 6.

Further purification is most satisfactorily carried out by subjecting an acid-addition salt of succinimycin to solvent extraction, to electrophoresis, to readsorption and elution, or to countercurrent distribution. For example, a 4 to 10% aqueous solution of succinimycin sulfate is diluted with isopropyl alcohol to a final concentration of 75 to 85% isopropyl alcohol. Insoluble impurities are removed by filtration and the isopropyl alcohol is removed by distillation to yield an aqueous solution of succinimycin sulfate. By the addition of water and sodium sulfate the solution is adjusted to contain about 1 to 2% succinimycin sulfate and 2.5 to 3% sodium sulfate. This aqueous solution is extracted with 7:1 (volume/weight) of chloroform-phenol, and the chloroform-phenol extracts discarded. The aqueous phase is then extracted with 1:1 (volume/weight) chloroform-phenol whereupon the product passes into the chloroform-phenol extract. These operations are carried out at a pH of 5 to 6 with adjustment of the acidity as required. The 1:1 chloroform-phenol extract is washed with water, concentrated to a small volume, diluted with a large volume of ether, and extracted with water until almost all of the product passes into the aqueous phase as shown by the transfer of color. The aqueous solution containing the product is washed with ether and with heptane and freeze-dried to give the more highly purified product.

If still further purification is desired it can be carried out by electrophoresis on cellulose powder, by countercurrent distribution, and by other procedures more fully described hereinafter.

Acid-addition salts of succinimycin can be converted to the free base by making an aqueous solution basic, by anion exchange on a resin, or by precipitation reactions such as treating succinimycin sulfate with barium hydroxide in order to remove the sulfate ion and leave the free base in solution. Succinimycin free base is converted to any desired acid-addition salt by treating an aqueous solution of the free base with an acid.

Succinimycin and its acid-addition salts are antibacterial substances of value in the treatment of bacterial infections. They are effective against a variety of gram-positive organisms, including staphylococci and streptococci and against some gram-negative organisms. They are especially valuable in treating staphylococcal infections caused by organisms resistant to commonly employed antibiotics. As a specific example of their use, succinimycin or preferably one of its acid-addition salts is dispersed in an ointment having an inert hydrocarbon base to give a concentration of 50,000 activity units per gram of ointment, and the ointment is used for topical application to skin infections.

Succinimycin and its acid-addition salts are also of value as chemical intermediates, as they undergo loss of iron upon treatment with iron-binding agents, such as cupferron, to give the corresponding iron-free compounds, des-iron succinimycin and its acid-addition salts. Acid-addition salts of des-iron succinimycin are converted to the free base by treatment with the calculated amount of sodium carbonate, sodium hydroxide, or other relatively strong base in cold aqueous solution. The free base is converted to an acid-addition salt by treatment with the calculated amount or a slight excess of the selected acid.

Des-iron succinimycin and its acid-addition salts are useful as chelating agents. They can be employed in the removal of iron and certain other metals from aqueous solutions. For example, in the preparation of solutions of various medicaments for parenteral administration they can be added to form an ionic chelate with small quantities of iron present as an impurity. The solution is then passed through iron-free activated carbon, which has a high adsorptive capacity for succinimycin, des-iron succinimycin, and their acid-addition salts, and the iron-free solution is separated from the carbon.

The invention is illustrated but not limited by the following examples.

*Example 1*

Sterile agar slants having the following composition are prepared:

| | Percent |
|---|---|
| Potato, peeled | 10 |
| Casein, pancreatic digested | 0.1 |
| Agar | 2.0 |

Distilled water to make 100%.

Two agar slants of the above composition are inoculated with lyophylized spores of *Streptomyces olivochromogenes* corresponding to NRRL 2608, incubated at 28° C. until sporulated and then stored at 5° C. The spores from the two slants are suspended in 20 ml. of 0.1% sterile sodium heptadecyl sulfate solution.

A nutrient medium having the following composition is prepared:

| | Percent |
|---|---|
| Lactose | 1.0 |
| Soybean oil meal, solvent extracted | 1.0 |
| Distillers solubles | 0.5 |
| Sodium chloride | 0.5 |
| Calcium carbonate | 0.1 |

Water to make 100%.

The pH of the medium is adjusted with 10-normal sodium hydroxide solution to pH 7.5.

Twelve liters of this medium is placed in a 30-liter stainless steel fermentor. The medium is sterilized by heating it at 121° C. for 90 minutes, allowed to cool, inoculated with the 20 ml. spore suspension described above, and incubated at 35.5° C. for 37 hours with air being supplied at the rate of 12 liters per minute and agitation at 250 r.p.m. One hundred and twenty grams of a crude lard and mineral oil antifoam is added on demand.

Sixty-four liters of a nutrient medium having the composition described above is placed in four 30-liter stainless steel fermentors. The fermentors are sterilized for 90 minutes at 121° C. and allowed to cool. Each of the fermentors is inoculated with 800 ml. of the fermentation mixture described above and the fermentors are incubated at 35° C. for 32 hours with air being supplied at the rate of 16 liters per minute and agitation at 250 r.p.m. Four hundred and sixty grams of an antifoam consisting of crude lard and mineral oils is added on demand. At 32 hours the beer has a potency of about 2233 *Bacillus subtilis* units per milliliter.

The beer is filtered and the filtrate is adjusted to pH 5.5–6. To 26 liters of the filtrate is added 1% by weight of carbon and 1% by weight of diatomaceous earth. Materials such as Darco G-60 and Celite 545 can be used. The mixture is stirred for 10 to 15 minutes and filtered through a plate and frame press precoated with diatomaceous earth. The cake is washed with 15% dilute acetone and finally with water. The product is eluted with 13 liters of 50% acetone and the pH of the eluate is adjusted to 5.5–6.0.

This 50% acetone eluate is percolated through a column containing 400 ml. of synthetic cation exchange resin in the sodium form. A material such as Dowex-50 X1 can be used. The column is washed well with water and the adsorbed product is eluted by slowly percolating a 5% sodium sulfate solution through the column. Usually 10 to 12 hold-up volumes of this solution are required to remove the major portion of the product from the column. The pH of the eluate, which has a volume of about 4 liters, is adjusted to between 5.5 to 6.0.

An 850 ml. aliquot of the eluate is stirred with 6 g. of activated carbon and 6 g. of diatomaceous earth for 10 to 15 minutes and filtered. The filter cake is washed with water until salt-free and then washed with a small amount of 15% aqueous methanol. The product is removed by elution with a total of 400 ml. of 50% aqueous acetone adjusted to pH 3.5 to 4.0 with sulfuric acid. The 50% acetone eluate is adjusted to pH 5.5 to 6.0 by stirring with an anion exchange resin in the hydroxyl form. A material such as Amberlite IR-45 can be used. The solution is filtered and the filtrate concentrated in vacuo and finally freeze-dried to yield succinimycin sulfate. At this stage the product is usually found to have an activity of 30,000 to 90,000 units per milligram.

Twenty-five grams of succinimycin sulfate assaying 30,000 to 40,000 units per milligram is dissolved in water to give 600 ml. of solution. Isopropyl alcohol (2620 ml.) is added with stirring. The mixture is allowed to stand for 16 to 48 hours at 0–5° C. and filtered through a pad of diatomaceous earth. The precipitate is discarded. The filtrate is adjusted to pH 6 and concentrated in vacuo at 30° C. to remove the isopropyl alcohol. Anhydrous sodium sulfate (47.3 g.) is added to the aqueous concentrate and the volume is adjusted to 1665 ml. with water. This solution is extracted 5 times with 300–400 ml. portions of 7:1 (volume/weight) of chloroform-phenol with periodic adjustment of the pH to maintain it between 5.6 to 6.0. After these operations the desired product is primarily in the aqueous phase. The organic extracts are discarded. The aqueous phase is adjusted to pH 5.6 and extracted 4 times with 300–400 ml. portions of 1:1 (volume/weight) of chloroform-phenol, with the pH being maintained at 5.2 to 6.0. After these operations the desired product is primarily in the organic phase. The combined organic extracts are washed twice with 130 ml. portions of water and then concentrated in vacuo at 30° C. to a volume of 500 ml. About 1500 ml. of ether is then added and the organic solution is extracted with 100 ml. portions of water until it is almost colorless. The combined aqueous extract is washed with ether and with heptane. At this stage the desired product is primarily in the aqueous phase. The pH of the aqueous phase is adjusted to 5.8 and the solution concentrated in vacuo and freeze-dried to give a more highly purified succinimycin sulfate. At this stage the product is usually found to have an activity of 140,000 to 190,000 units per milligram.

If further purification is desired it can be carried out by electrophoresis. An aqueous solution of succinimycin sulfate is converted to the acetate by passing it through a column of an anion exchange resin. A material such as Dowex-1 X2 in the acetate form can be used. A piece of glass tubing of 3.2 cm. outside diameter and approximately 60 cm. long is tightly packed with cellulose powder and saturated with 0.05 molar pH 4.9 pyridine acetate buffer. Between 150–250 mg. of partially purified succinimycin acetate is applied to each of a series of such tubes which are then subjected (two at a time) to horizontal electrophoresis using 350 to 380 volts at about 18 milliamperes for 40 to 45 hours at 5° C.

In each case, three distinct orange zones separate. One migrates directly into the anolyte. A second, containing the desired product, moves the fastest toward the cathode as a broad band with an approximate relative mobility of $4.0 \times 10^{-5}$ cm.$^2$ sec.$^{-1}$ volt$^{-1}$. A third, with an approximate relative mobility of $1.4 \times 10^{-5}$ cm.$^2$ sec.$^{-1}$ volt$^{-1}$ also moves toward the cathode and possesses no succinimycin activity. After the electrophoresis, the portion of the cellulose corresponding to the broad orange band near the cathode is triturated with water and the suspension filtered.

The filtrates from a number of tubes are combined and freeze-dried. The dark red residue is redissolved in water and the pH of the solution is adjusted to 5.4 with dilute acetic acid. The solution is filtered and freeze-dried to give a residue of succinimycin acetate. At this stage the product is usually found to have an activity of 170,000 to 190,000 units per milligram. By analysis this sample of succinimycin acetate is found to contain 46.22, 46.12% carbon; 6.69, 6.89% hydrogen; 8.85% nitrogen; 4.12% iron (as determined by X-ray); 0.0% sulfur; and 6.72, 7.09% ash. By perchloric acid titration in glacial acetic acid the equivalent weight is found to be approximately 1000.

By repeating the electrophoresis procedure there is obtained succinimycin acetate having an activity of approximately 200,000 units per milligram. By analysis this purified sample of succinimycin acetate is found to contain 45.17, 45.03% carbon; 7.22, 6.85% hydrogen; and 8.37, 8.26% nitrogen.

The compound can also be purified with activated charcoal. A sample of succinimycin acetate which has been purified twice by electrophoresis is adsorbed on activated charcoal and eluted from the charcoal with 50% aqueous acetone adjusted to pH 4.7 with acetic acid. The solution is freeze-dried to yield purified succinimycin acetate as a deep red-orange powder with an activity of approximately 200,000 units per milligram. By analysis this sample is found to contain 45.81, 45.47% carbon; 7.00, 7.04% hydrogen; 8.53, 8.73% nitrogen; and 7.79, 7.49% ash. Principal infrared absorption maxima as determined in a potassium bromide disc appear at about 3.00, 3.44, 5.78, 6.06, 6.35, 6.85, 7.03, 7.36, 7.94, 8.6, 9.7 and 13.1 microns. In the visible and ultraviolet range an absorption maximum appears at 430 millimicrons $$E_{1\,cm.}^{1\%} = 22.8$$

The compound can also be purified by countercurrent distribution. For example, a sample of crude or partially purified succinimycin acetate is partitioned between benzyl alcohol and a 1.75 molar sodium acetate solution adjusted to a pH of 5.7 with acetic acid and subjected to countercurrent distribution in a 100 tube apparatus. The tubes having the greatest activity against *Bacillus subtilis* are combined and ether is added. The aqueous phase, which contains most of the product, is extracted with 1:1 chloroform-phenol and the aqueous phase is discarded. The combined organic extracts are washed with water. Ether is added to the chloroform-phenol layer from which the activity is then extracted with water. The pH of the aqueous extract is adjusted to about 5.5 and passed through a quaternary ammonium type anion exchange resin in the acetate form. A material such as Dowex-1 X2 can be used. Purified succinimycin acetate is recovered from the effluent and water wash by freeze-drying. By analysis this sample is found to contain 46.39, 46.17% carbon; 7.23, 6.91% hydrogen; 8.92, 8.85% nitrogen; 4.85% iron and 6.85, 7.54% ash.

*Example 2*

A batch of succinimycin sulfate is analyzed for its sulfate content. A solution of 2 g. of succinimycin sulfate in 100 ml. of water is treated with the calculated amount of barium hydroxide required to convert all of the sulfate ion present to barium sulfate. The barium sulfate is removed by filtration, leaving an aqueous solution of succinimycin free base. If the solid free base is desired, it is obtained by freeze-drying the solution. Because of the relatively instability of the free base compared with the acid-addition salts, the operations involved in its preparation and isolation should be carried out as rapidly and at as low a temperature as possible.

Succinimycin free base is also obtained by making a solution of a succinimycin acid-addition salt basic with sodium carbonate or sodium hydroxide, or by passing an aqueous solution of a succinimycin acid-addition salt through an anion exchange column packed with an anion exchange resin in the hydroxyl form having a minimum adsorptive capacity.

Succinimycin free base is converted to any desired acid-addition salt by treating an aqueous solution of the free base with the calculated amount or a slight excess of a selected acid, such as acetic, propionic, citric, or sulfuric acid. The desired salt is then isolated by freeze-drying.

*Example 3*

To a solution of 64 mg. of succinimycin acetate in 30 ml. of water, having a pH of about 6.0, is added 1 ml. of 1.5% cupferron (the ammonium salt of N-nitrosophenylhydroxylamine). Then 10 ml. of 2:1 chloroform-butanol is added and the pH of the aqueous phase is adjusted to 4.0 with acetic acid. The mixture is stirred for a few minutes and the dark red chloroform layer, which contains an iron chelate of cupferron, is separated and discarded. With periodic adjustment of the aqueous phase to pH 4 the treatment with 1.5% cupferron and removal of iron chelate with chloroform-butanol is repeated several times or until the aqueous phase is pale yellow and the chloroform-butanol extract is almost colorless. The aqueous phase at pH 4 is then extracted with a total of 40 ml. of 1:1 phenol-chloroform in 3 portions. The organic extract, which contains the desired product, is washed with 3 ml. of water to remove ammonium acetate and filtered. The filtrate is stirred with 20 ml. of water and 150 ml. of ether and the aqueous phase, which now contains the desired product, is separated and washed with ether and then with heptane. The aqueous phase is freeze-dried in steps with periodic adjustment of the pH to about 5.3 with acetic acid. The residue obtained is des-iron succinimycin acetate as a light pink or almost colorless product. The infrared absorption spectrum of this compound is very similar to that of succinimycin acetate. However, in the ultraviolet and visible range it shows end absorption below 260 millimicrons but no appreciable absorption from 260–550 millimicrons. The absorption maximum of succinimycin acetate at 430 millimicrons is totally absent in des-iron succinimycin acetate. Des-iron succinimycin acetate contains about 48% carbon (range of experimentally determined values 47.71 to 47.97), and about 7.5% hydrogen (range of experimentally determined values 7.58 to 7.84). The specific rotation $[\alpha]_D^{27}$ is about $+76°$ (0.33% in water).

Des-iron succinimycin acetate is converted to the free base, des-iron succinimycin, by treatment with the calculated amount of sodium carbonate, sodium hydroxide, or other relatively strong base. Des-iron succinimycin is converted to other acid-addition salts by treatment with the calculated amount or a slight excess of an acid such as propionic, maleic, citric, hydrochloric, or sulfuric acid.

Des-iron succinimycin and its acid-addition salts form metal chelates by the addition of aqueous solutions of salts such as ferric lactate and cupric acetate.

We claim:

1. Process for the production of a compound of the class consisting of succinimycin and acid-addition salts thereof, which comprises inoculating an aqueous nutrient medium containing sources of assimilable carbon and nitrogen with the NRRL 2608 strain of *Streptomyces olivochromogenes* and incubating the inoculated medium at a temperature from about 20 to 40° C. under aerobic conditions.

2. Process for the production of acid-addition salts of succinimycin which comprises inoculating an aqueous nutrient medium having a pH between 6 and 8 and containing sources of assimilable carbon and nitrogen and added inorganic salt, with the NRRL 2608 strain of *Streptomyces olivochromogenes*; incubating the inoculated medium at a temperature from about 20 to 40° C. under aerobic conditions until substantial antibacterial activity is imparted to the medium; and isolating the product at a pH between 4 and 6.

3. Acid-addition salts of succinimycin, said acid-addition salts being exemplified by the acetate which contains the elements carbon, hydrogen, nitrogen, oxygen, and iron; is relatively unstable in acidic and basic solutions; upon hydrolysis yields succinic acid, 1,5-pentanediamine, ammonia, methylamine, and proline; upon paper electrophoresis in 0.05-molar pH 4.0 acetate buffer for 2.5 hours at 360 volts and 12 milliamperes travels 7.9 centimeters from the origin toward the cathode; upon paper chromatography with 70:30 isopropyl alcohol:0.2-molar pH 6.0 acetate buffer exhibits in $R_f$ of 0.40; upon paper chromatography with 80:20 ethanol:0.2-molar pH 6.0 acetate buffer exhibits an $R_f$ of 0.52; is found by analysis to contain approximately 46% carbon, 7% hydrogen, 8.5% nitrogen, and 4.5% iron; has an equivalent weight of about 1000; exhibits an absorption maximum in the ultraviolet and visible region at 430 millimicrons in pH 7 phosphate buffer and exhibits prominent infrared absorption maxima at 3.00, 3.44, 5.78, 6.06, 6.35, 6.85, 7.03, 7.36, 7.94, 8.6, 9.7, and 13.1 microns in a potassium bromide disc; is further characterized by the loss of iron upon treatment with a chelating agent to form the iron-free compound, des-iron succinimycin acetate, which is an almost colorless material, contains the elements carbon, hydrogen, nitrogen, and oxygen; gives negative Ehrlich's, Fehling's, Benedict's, and ninhydrin tests, is found by analysis to contain approximately 48% carbon and 7.5% hydrogen, shows end absorption below 260 millimicrons but no appreciable absorption from 260–550 millimicrons, and has infrared absorption maxima at wavelengths substantially identical with those of succinimycin acetate.

4. Succinimycin acetate, as defined in claim 3.

References Cited by the Examiner
UNITED STATES PATENTS 3,033,760  5/62  Gaeumann _____ 195—80

FOREIGN PATENTS 569,746  7/58  Belgium.

FRANK CACCIAPAGLIA, JR., *Primary Examiner.*

WILLIAM B. KNIGHT, MORRIS O. WOLK, JULIAN S. LEVITT, *Examiners.*